US008844465B2

(12) United States Patent  (10) Patent No.: US 8,844,465 B2
Holland et al.  (45) Date of Patent: Sep. 30, 2014

(54) APPARATUS AND METHOD FOR CONTROLLING MATURATION OF AQUATICALLY HATCHED INSECTS

(76) Inventors: Kristian J. K. Holland, Lively (CA); Gerardo Ulibarri, Whitefish (CA)

( * ) Notice: Subject to any disclaimer, the term of this patent is extended or adjusted under 35 U.S.C. 154(b) by 299 days.

(21) Appl. No.: 13/259,713

(22) PCT Filed: Apr. 8, 2009

(86) PCT No.: PCT/CA2009/000442
§ 371 (c)(1),
(2), (4) Date: Sep. 23, 2011

(87) PCT Pub. No.: WO2010/115258
PCT Pub. Date: Oct. 14, 2010

(65) Prior Publication Data
US 2012/0017834 A1  Jan. 26, 2012

(51) Int. Cl.
*A01K 29/00* (2006.01)
*A01M 1/10* (2006.01)

(52) U.S. Cl.
CPC .................................... *A01M 1/106* (2013.01)
USPC ....................................................... 119/6.5

(58) Field of Classification Search
USPC ......... 47/41.01, 41.11, 48.5, 65.5, 65.7, 66.6, 47/66.7, 75, 86; 119/6.5, 6.6, 6.7, 6.8, 119/50.7, 245, 246, 247, 251, 252; 206/423, 499, 503–520; 220/23.83, 220/23.86, 23.87, 23.88, 23.89, 913; 449/26, 32; 43/54.1, 55, 56, 57, 107, 43/132.1, 133, 134; 49/26, 33
See application file for complete search history.

(56) References Cited

U.S. PATENT DOCUMENTS

| | | | | |
|---|---|---|---|---|
| 1,351,410 A | * | 8/1920 | Bruning | 99/298 |
| 1,712,986 A | * | 5/1929 | Favata, Jr. | 47/80 |
| 1,974,549 A | * | 9/1934 | Spencer et al. | 119/6.5 |
| 2,278,991 A | * | 4/1942 | Hasslacher et al. | 417/137 |
| 2,306,027 A | * | 12/1942 | Swaney | 47/79 |
| 3,991,514 A | * | 11/1976 | Finck | 47/61 |
| 3,997,999 A | | 12/1976 | Evans | |
| 4,192,254 A | * | 3/1980 | Apel | 119/6.7 |
| 4,265,050 A | * | 5/1981 | Buescher | 47/79 |
| 4,328,636 A | | 5/1982 | Johnson | |
| 4,335,540 A | * | 6/1982 | Allen | 47/79 |
| 4,360,987 A | | 11/1982 | Lowder | |

(Continued)

FOREIGN PATENT DOCUMENTS

CA   2623601 A1   6/2008

OTHER PUBLICATIONS

International Search Report and Written Opinion dated Dec. 31, 2009 from corresponding International Patent Application No. PCT/CA2009/000442, filed Apr. 8, 2009, 11 pages.

*Primary Examiner* — Rob Swiatek
*Assistant Examiner* — Ebony Evans

(57) ABSTRACT

An apparatus and method for controlling maturation of aquatically hatched insects. The apparatus comprises a drainable container for housing an egg laying medium for the insects; a filter operatively connected to the container for containing debris in the egg laying medium; and a selectively sealable catch basin located below the container for receiving the egg laying medium from the container when the container is drained. One or more outlets are provided on the catch basin for operatively releasing gas from the catch basin. The apparatus and method enhances the attractiveness of the artificial breeding pool to the gravid insects and helps control the local insect population.

16 Claims, 4 Drawing Sheets

(56) References Cited

U.S. PATENT DOCUMENTS

| | | | |
|---|---|---|---|
| 4,937,972 A * | 7/1990 | Freitus | 47/62 R |
| 6,474,259 B1 * | 11/2002 | Gaugler | 119/6.7 |
| 6,568,124 B1 | 5/2003 | Wilbanks | |
| 6,584,730 B1 * | 7/2003 | Mai | 47/79 |
| 6,691,460 B1 * | 2/2004 | Lee | 47/79 |
| 6,990,768 B1 | 1/2006 | Boston | |
| 7,134,238 B2 | 11/2006 | Forehand | |
| 7,448,160 B2 * | 11/2008 | Roberts | 43/107 |
| 2006/0086037 A1 | 4/2006 | Roberts | |

* cited by examiner

APPARATUS AND METHOD FOR CONTROLLING MATURATION OF AQUATICALLY HATCHED INSECTS

RELATED APPLICATIONS

This U.S. national stage application claims priority under 35 U.S.C. §371 to International Patent Application No. PCT/CA2009/000442, filed on Apr. 8, 2009, the disclosures of which are incorporated by reference herein in its entirety.

FIELD OF THE INVENTION

The present invention relates to an insect population control apparatus and method. In particular, the present invention relates to an apparatus and method for controlling maturation of aquatically hatched insects.

BACKGROUND OF THE INVENTION

It is well documented that biting insects, specifically Culicidae (mosquito), are vectors for many diseases throughout the world. In an effort to eliminate insect-borne diseases, such as malaria and dengue fever, extensive efforts have been carried out worldwide to diminish or eliminate these insects from areas inhabited by humans.

The use of pesticides, such as larvicides, adulticides, Dichloro-Diphenyl-Trichloroethane (DDT) and malathion, to control insects over large areas and the problems associated therewith are well documented. Serious long lasting consequences to both the environment and human health have resulted from the use of such pesticides. The use of pesticides are not desired for environmental reasons, and these chemicals are known to repel insects, thereby decreasing the effectiveness of these methods. Furthermore, there is evidence that some species of insects are beginning to become resistant to these chemicals.

To control insects in more localized areas, such as backyards, various traps have been developed. These traps include: bug zappers and devices that release various gases to attract the insects. The primary purpose of these techniques is to immediately eliminate the insects. However, these techniques do not prevent the population from growing from those eggs and larvae that exist in the breeding ground of these insects.

In addition to these methods, attempts have been made to provide artificial breeding pools that trap the hatching insects. For example, U.S. Pat. No. 5,896,697 discloses an artificial breeding pool where the eggs are trapped behind a screen that prevents the newly hatched mosquitoes from escaping into the environment. U.S. Pat. No. 3,997,999 discloses an apparatus that traps newly hatched mosquitoes in a separate column from where the eggs were laid.

Artificial breeding pools that eliminate the newly laid eggs or larvae have also been contemplated. For example, U.S. Pat. No. 6,708,443 discloses an apparatus where the artificial breeding pool contains a filter that traps the eggs and larvae and then exposes the captured biomass to air causing the biomass to dry and thus be eliminated. U.S. Pat. No. 6,990,768 discloses a similar apparatus with the exception that the filter is provided in the form of a belt that captures the biomass and then passes it through a crushing mechanism to eliminate the eggs and larvae.

Although standing water will naturally attract most insects that rely on water to lay their eggs, chemical attractants can be added to the water to increase the attractiveness of the pool to the pregnant insect. For example, US Patent Publication No. 2008/0003197 discloses a controlled release attractant for use in an artificial breeding pool.

Research has shown that after eggs are laid, a chemical cue is released that signals to other mosquitoes that the location is a successful breeding site, which in turn attracts other mosquitoes to lay their eggs. Most of this chemical cue is thought to be released after hatching. The natural chemical cue is a very effective attractant, and acts synergistically with any attractant already in solution. Accordingly, if this natural chemical cue is preserved and concentrated over time, the trap will be more effective in attracting mosquitoes from a larger area.

SUMMARY OF THE INVENTION

It is an object of the present invention to provide an apparatus and method for controlling maturation of aquatically hatched insects that addresses the limitations of the prior art.

The apparatus and method of the present invention makes use of the natural chemical cues released by hatching insects to improve the effectiveness of the pool to attract other insects.

According to an aspect of the present invention, there is provided an apparatus for controlling maturation of aquatically hatched insects. The apparatus comprises: a drainable container for housing an egg laying medium for the insects; a filter operatively connected to the container for harvesting unwanted matter from the egg laying medium; and a selectively sealable catch basin located below the container for receiving the egg laying medium from the container when the container is drained, wherein one or more outlets are provided on the selectively sealable catch basin for operatively releasing gas from the catch basin.

In one embodiment of the invention, the filter is housed within the selectively sealable catch basin.

In another embodiment of the invention, the filter is provided outside the selectively sealable catch basin.

In further embodiment of the invention, the one or more outlets comprise one-way valves, baffles, vents, grates or combinations thereof. These one or more outlets can be directed toward the drainable container.

In yet another embodiment of the invention, the selectively sealable catch basin is connected to the drainable container to allow transfer of the egg laying medium from the selectively sealable catch basin to the drainable container. A pump can be provided to facilitate the transfer of the egg laying medium.

In another embodiment of the invention, the apparatus further comprises a selectively sealable reservoir connected to the catch basin. One or more secondary outlets can be on the selectively sealable reservoir for operatively releasing gas from the reservoir. These one or more secondary outlets comprise one-way valves, baffles, vents, grates or combinations thereof. The one or more secondary outlets can be directed toward the drainable container.

In further embodiment of the invention, the selectively sealable reservoir is connected to the drainable container to allow transfer of the egg laying medium from the selectively sealable reservoir to the drainable container. In this case, a secondary pump can be provided to facilitate the transfer of the egg laying medium.

In yet a further embodiment of the invention, a tank can be connected to the drainable container to allow transfer of the liquid from the tank to the drainable container. A pump made be provided to facilitate the transfer of the liquid.

In a still further embodiment of the invention, the drainable container further comprises a valve positioned at the base of the container for controlling the flow of the egg laying medium from the container.

In an embodiment of the invention, means for forcing the gas contained in the selectively sealable catch basin through one or more of the outlets are provided.

In another embodiment, means for forcing the gas contained in the selectively sealable reservoir through one or more of the secondary outlets are provided.

In yet another embodiment, a screen is positioned in the catch basin above the egg laying medium for preventing the release of insects from the catch basin.

According to a further aspect of the present invention, there is provided a selectively sealable container for use in an apparatus for controlling maturation of aquatically hatched insects. The selectively sealable container comprising: a sealable port on the surface of the selectively sealable container for receiving a liquid; and one or more outlets on the surface of the selectively sealable container for exhausting gas accumulated therein.

In one embodiment, a second sealable port is provided on the surface of the container for transferring the liquid from the container.

In another embodiment, a screen positioned in the container in the vicinity of the sealable port and the outlets is provided.

According to another aspect of the present invention, there is provided a method for attracting gravid insects to an artificial breeding pool, comprising the steps of: providing an egg laying medium enriched with chemical attractants in a container; exhausting accumulated gas from a second container housing previously filtered egg laying medium in the vicinity of the egg laying medium.

In one embodiment, the gas is exhausted through an outlet on the surface of the second container.

In another embodiment, the steps of filtering the egg laying medium in the container; and storing the filtered egg laying medium in the second container are included.

BRIEF DESCRIPTION OF THE DRAWINGS

These and other features, aspects and advantages of the present invention will become better understood with regard to the following description and accompanying drawings wherein.

DETAILED DESCRIPTION OF THE INVENTION

The following description is of a preferred embodiment by way of example only and without limitation to the combination of features necessary for carrying the invention into effect.

Although the present invention will be described with reference to mosquitoes, it should be understood that the apparatus and method will be suitable for any insect that lays their eggs in aquatic locations, such as blackflies, dragonflies and water scorpions.

Figure 1:
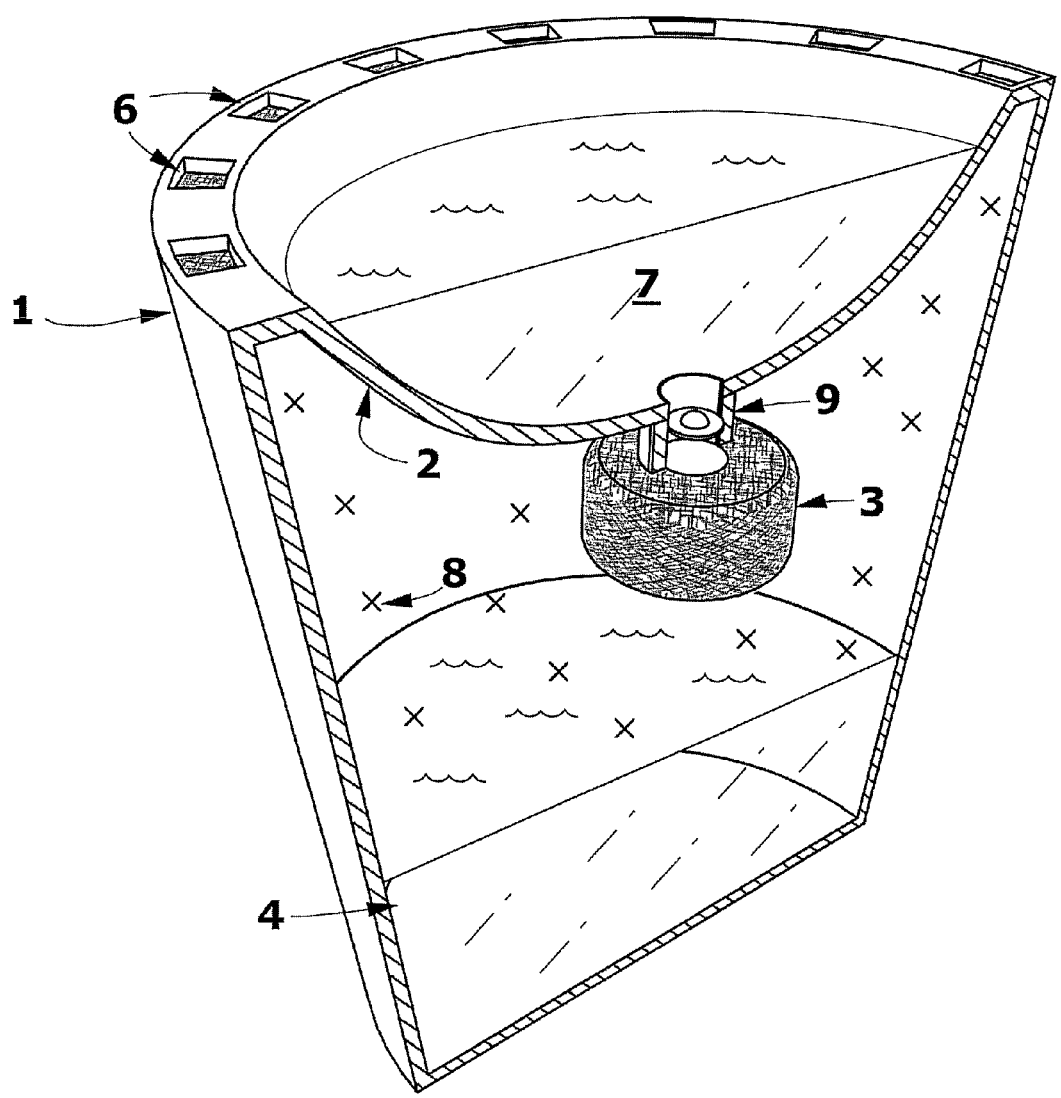
FIG. 1 is a cross-sectional view of an apparatus according to an embodiment of the present invention.

As shown in FIG. 1, the apparatus (1) comprises a drainable container (2), a filter (3), a selectively sealable catch basin (4) and one or more outlets (6) on the catch basin (4). The drainable container (2) can house an egg laying medium (7) that will attract insects to lay their eggs in the medium. The drainable container (2) is operatively connected to the filter (3) so that when the egg laying medium (7) is drained from the container (2) it passes through the filter (3). The filter (3) captures any unwanted debris from the egg laying medium (7) and allows the medium (7) to permeate into the selectively sealable catch basin (4). Once the medium (7) enters the catch basin (4), the basin can be sealed to prevent gas (8) from escaping therefrom. One or more outlets are provided on the catch basin (4) to selectively release the gas (8) that has accumulated in the basin (4).

In operation, the drainable container (2) is filled with an egg laying medium (7) that attracts the gravid mosquitoes to lay their eggs in the medium (7). Either by manual or automatic operation, the container (2) is drained of the egg laying medium (7). The medium (7) then passes through a filter (3) that prevents the eggs, larvae and other unwanted matter from passing therethrough. The medium (7) that does pass through the filter (3) will contain the natural chemical cues released by the hatching eggs that still reside in the medium (7). The filtered medium (7) is gathered in the catch basin (4). Once the filtered medium (7) is inside the catch basin (4), the basin (4) is sealed to prevent gas (8) from escaping the basin (4). Over time, some of the natural chemical cues are released from the filtered medium (7). These airborne natural chemical cues form part of the gaseous phase within the catch basin (4). One or more outlets (6) on the catch basin can be opened either manually or automatically to selectively release the gas containing the natural chemical cues from the catch basin (4). In addition to the natural chemical cues that exist in the egg laying medium (7) of the container (2), the cues released from the catch basin (4) in the surrounding air help increase the attractiveness of the artificial pool to gravid mosquitoes.

The container (2) may be drained by a number of different means. For example, the container (2) may be provided as shown in FIG. 1, where the container (2) is concave is shape with a drain pipe (9) provided in the base of the container (2). Either within the drain pipe (9) or the container (2) a valve may be provided to control when the container (2) is drained. In this example, the container (2) is drained by the force of gravity. However, a pump (not shown) may also be provided in conjunction with the container (2) to drain the egg laying medium (7) therefrom.

The shape, size and colour of the drainable container (2) may be chosen to assist in attracting an insect to the pool to lay its eggs. For example, it is believed that mosquitoes prefer dark environments to lay their eggs. Accordingly, the container (2) may be provided in a dark colour. A dark colour container (2) would also retain heat, which has also been shown to be an attractant for mosquitoes and other flying insects. If the container is dark in colour it may be beneficial to provide a translucent strip down the side of the container (2), so that the water level can be visually monitored. In order to accommodate the different breeding habits of the various insects that may use the artificial breeding pool to lay their eggs, the depth of the medium (7) in the container (2) may be varied.

In order to improve the effectiveness of the apparatus to attract mosquitoes, the egg laying medium (7) may be supplemented with one or more synthetic chemical attractants, such as those described in US Patent Publication No. 2008/0003197. The egg laying medium itself may be a composition of liquid and chemical attractants, or the chemical attractants may be housed in a separate container that is either mounted on the container (2) or suspended in the egg laying medium (7). In some situations, it may be beneficial to suspend the chemical attractants in the catch basin (4) or the egg laying medium contained therein. In most cases, the egg laying medium (7) will be water with or without chemical attractants, as water has been shown to be an effective natural breeding ground for mosquitoes.

Figure 2:
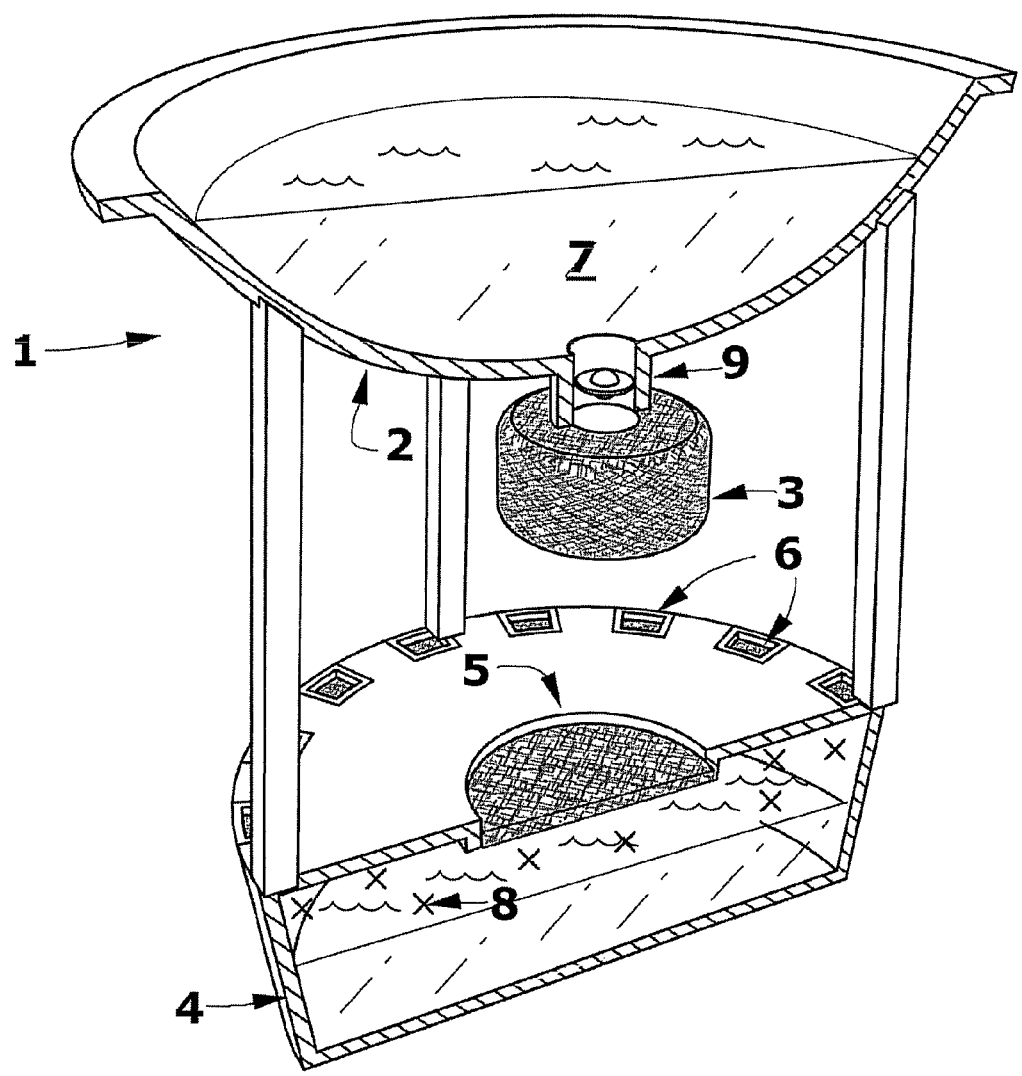
FIG. 2 is a cross-sectional view of an apparatus according to an embodiment of the present invention.

The filter (3) can be positioned either within the catch basin (4) or outside the catch basin (4). As shown in FIG. 2, if the filter (3) is positioned outside the catch basin (4), a sealable opening (5) should be provided in the catch basin (4) to allow the egg laying medium (7) to pass into the basin (4). The opening (5) can be sealed by a number of different means, including, but not limited to, a slideable door or a diaphragm valve. The opening (5) can be controlled manually or can be automated.

The actual design of the filter (3) will depend on several factors, such as the location in which the apparatus is installed, the size and type of biomass being eliminated, and whether the filter (3) is positioned inside or outside the catch basin (4). The pore size of the filter (3) should be small enough to prevent unwanted debris, such as insect eggs, larvae, twigs, leaves, blossoms, etc., from passing through the filter (3). However, the pore size of the filter (3) should be of sufficient size to allow passage of the egg laying medium (7) and any natural or synthetic attractant existing in the medium (7).

The filter (3) of the apparatus may also be used for research and monitoring purposes. For example, population data can be obtained from the filter (3) by either viewing the composition of the biomass under a microscope or collecting the biomass for further analysis.

In order to prevent gas from escaping from catch basin (4) in between periods when the egg laying medium (7) is being collected, the basin (4) should be sealable to create an airtight environment within the basin (4). The basin (4) should be deep enough to allow for the collection of the egg laying medium (7) as well as providing an air gap in the basin (4). To prevent the release of any mosquitoes that may have escaped filtration and hatched from the medium collected in the basin (4), a screen (10) may be provided above the waterline of the basin (4) with a mesh size capable of preventing the passage of mosquitoes (see FIG. 3).

To assist in the evaporation of the egg laying medium (7) in the catch basin (4), it may be desirable to construct the basin (4) from a material with a low albedo value, which will more rapidly heat up the medium (7) compared to light coloured material.

One or more outlets (6) are provided on the basin (4) to allow the gas in the basin (4) to escape into the environment. The operation of the outlets (6) should be controllable so that the gas can released at times when the mosquito population are most active, such as the evening hours, and retained in between the periods when insect activity is diminished. In some instances, it may be beneficial to fix one or more of the outlets in the open position. The operation of the outlets (6) can be manual or automated.

The outlets (6) can all be the same or can be a combination of different types of outlets. Suitable types of outlets for this application include, are not limited to, one-way valves, baffles and grates. A screen (not shown) can be placed at or near the portion of the outlet (6) facing the inside of the catch basin (4) to prevent any mosquitoes that hatch from the medium collected in the catch basin (4) from escaping to the environment, or gravid mosquitoes from entering to lay their eggs in the catch basin.

In order to facilitate the release of the accumulated gas from the catch basin, the catch basin (4) may be pressurized prior to the opening of the outlets (6). Alternatively, a fan (11) may be provided in the catch basin (4) to assist in forcing the gas through the outlets (6). This fan (11) may also assist in the drying of the filter (3) after the egg laying medium (7) has been passed through. To increase the efficiency of the system, the fan (11) may be appropriately ducted to the outside environment in order to increase the air pressure inside the filter, to increase the speed of filtration and drying of the filter.

Although exhausting the gas (8) into the environment around the apparatus (1) will increase the attractiveness of the artificial breeding pool to gravid mosquitoes, it may be desired to position the outlets (6) on the catch basin (4) so that the gas is exhausted to an area in the vicinity of the drainable container (2) and the egg laying medium (7). In one embodiment, the outlets (6) exhaust the gas (8) directly into the egg laying medium (7).

The filtered egg laying medium (7) that exists in the catch basin (4) may be pumped back into the drainable container (2) to replenish the supply of medium (7). Each successive cycle of filtering and replenishing increases the concentration of attractants, both natural and synthetic, in the egg laying medium (7). In order to prevent build-up of biomass on the inside of the container (2) it is desirable to have the pump (12) connected to a nozzle (24) in the vicinity of the container (2) in order to swirl the medium (7) around the container (2).

Figure 3:
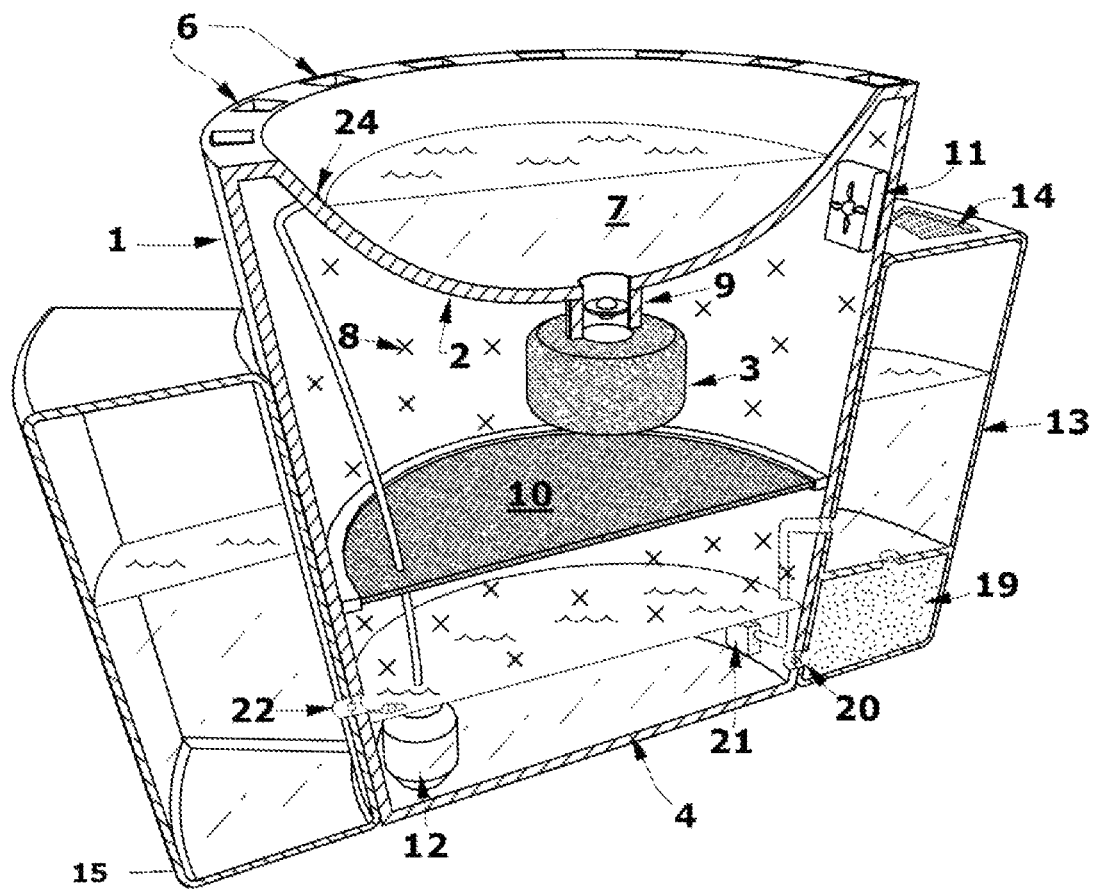
FIG. 3 is a cross-sectional view of an apparatus according to an embodiment of the present invention.

As shown in FIG. 3, a reservoir (13) may be also be provided to house additional filtered egg laying medium (7). In larger applications, it may be beneficial to provide more than one reservoir (13). In most cases, the filtered medium (7) in the reservoir (13) will be from medium originally gathered in the catch basin (4). The medium can be transferred from the catch basin (4) to the reservoir (13) by a number of different means, including, but not limited to, gravity, pressure or a pump (21). A one-way valve (20) or some other means of preventing uncontrolled flow between the reservoir (13) and the catch basin (4) can be provided.

In certain applications, the insect attracted to the apparatus may prefer a more pristine medium to lay their eggs. In these situations, but not limited to this particular situation, a secondary filter (19) may also be provided inline with the catch basin (4) and reservoir (13). This secondary filter (19) may have the same composition as the filter (3) or may be a filter of different composition in order to capture selective components from the filtered medium. For example, a high quality particulate filter may be provided to remove all components from the medium, except for dissolved material, such as the natural or synthetic attractants from the egg laying medium (7). In other embodiments, a sand/carbon filter may be used to remove unwanted matter from the egg laying medium. Such a filter may be preferable when gravity is used to transfer the egg laying medium from the catch basin to the reservoir (13).

Depending on the application, a ultra-violet (UV) light may also be added to sterilize the solution as it passes through the filtration system. Once the egg laying medium has been completely filtered and is residing in the reservoir (13), either a fan can be turned on to desiccate the interior of the catch basin (4) and/or a UV light can be turned on to sterilize the interior of the catch basin (4). Once the system determines that it has been sterilized, either by on the basis of time or some other parameter, the filtered medium can be returned to the catch basin (4).

To improve the efficiency of the apparatus, the reservoir (13) can also be selectively sealable, similar to the catch basin (4). In this case, natural chemical cues that escape from the medium (7) housed in the reservoir (13) will be trapped for use in a manner similar to the gas (8) in the catch basin (4). Accordingly, one or more secondary outlets (14) may be provided on the reservoir (13) to selectively release the gas (8) into the environment or egg laying medium (7) housed in the container (2). Similar to the catch basin (4), the exhausting of gas from the reservoir (13) can be aided by pressurizing the reservoir (13) or providing a fan in the interior of the reservoir (13).

Means, such as grates or screens, can be positioned in the reservoir (13) to prevent the release of mosquitoes to the environment, which hatch from eggs that escape filtration.

The filtered egg laying medium (7) contained in the reservoir (13) can be returned to the container (2) in much the same way as the liquid contained in the catch basin (4).

Depending upon the environment in which the apparatus (1) is situated, high rates of evaporation from the drainable container (2) may be an issue. In addition, certain insects prefer clean egg laying medium (7) to lay their eggs. In these cases, a tank (15) may be provided, which houses fresh egg laying medium (7) (as shown in FIG. 3). Either through manual or automatic operation, egg laying medium (7) can be transferred from the tank (15) to the container (2) or the catch basin (4). A one-way valve (22) or the like may be provided between the tank (15) and the catch basin (4) to prevent filtered medium from contaminating the fresh medium. In an exemplary embodiment, the liquid in this tank (15) can be filled by the collection of rain water, through connection to larger storage vesicle or by connection to a municipal water supply. In the case of the latter, it may be necessary to allow the water some time to "gas-off" the chlorine contained in the water.

Figure 4:
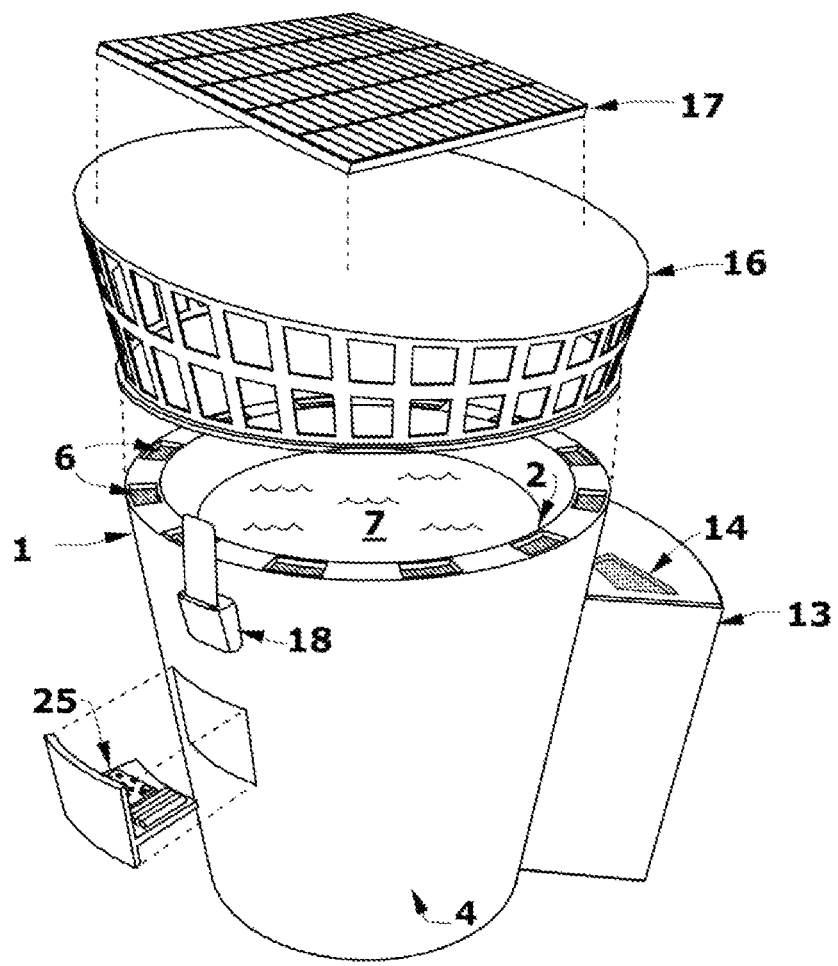
FIG. 4 is a perspective view of an apparatus according to an embodiment of the present invention.

The apparatus (1) may be constructed of modular pieces, which may facilitate repair and routine maintenance, as well as allow for certain components to be easily upgraded. Alternatively, the components of the apparatus (1) may be housed altogether in a solid structure, or formed as a unitary structure. As shown in FIG. 4, a roof (16) can be provided over the apparatus to provide a surface for the mounting of additional equipment, such as solar panels (17) to power the electrical components of the apparatus (1), communications equipment (18) and the like. As an alternative, the equipment can be mounted on any surface of the apparatus. The roof (16) can also trap and localize the gas released from the outlets (6, 14) in the vicinity of the drainable container (2). The roof (16) will also limit the amount of twigs, blossoms and leaves that enter the drainable container (2) and can be provided so that it facilitates the runoff of rain water into the tank (15).

A control system (25) can be provided to automate one or all of the different processes associated with the apparatus (1). The control system can include a timer programmed to initiate a cycle at a set time, preferably allowing some of the mosquito eggs in the container (2) sufficient time to hatch and release their chemical cues into the egg laying medium (7). The control system (25) can also have an external thermometer and/or photodynamic sensor to adjust the timing of the cycle, depending on the ambient temperature, and the amount of light available. When the control system initiates a cycle, it sends a signal to drain the container (2). The amount of medium (7) released from the container can be controlled by the length of time the drain is open or by a float switch that signals for the control system to stop the draining process.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

We claim:

1. An apparatus for controlling maturation of aquatically hatched insects, the apparatus comprising:
   a drainable container for housing an egg laying medium for the insects;
   a filter operatively connected to the container for harvesting unwanted matter from the egg laying medium;
   a selectively sealable catch basin located below the container for receiving the egg laying medium from the container when the container is drained, wherein one or more outlets directed towards the drainable container are provided on the selectively sealable catch basin for operatively releasing gas from the catch basin to an area in the vicinity of the drainable container; and
   a selectively sealable reservoir connected to the catch basin.

2. The apparatus according to claim 1, wherein the filter is housed within the selectively sealable catch basin.

3. The apparatus according to claim 1, wherein the filter is provided outside the selectively sealable catch basin.

4. The apparatus according to claim 1, wherein the one or more outlets comprise one-way valves, baffles, vents, grates or combinations thereof.

5. The apparatus according to claim 4, wherein the selectively sealable catch basin is connected to the drainable container to allow transfer of the egg laying medium from the selectively sealable catch basin to the drainable container.

6. The apparatus according to claim 5, further comprising a pump to facilitate the transfer of the egg laying medium.

7. The apparatus according to claim 1, further comprising one or more secondary outlets on the selectively sealable reservoir for operatively releasing gas from the reservoir.

8. The apparatus according to claim 7, wherein the one or more secondary outlets comprise one-way valves, baffles, vents, grates or combinations thereof directed toward the drainable container.

9. The apparatus according to claim 7, wherein the selectively sealable reservoir is pressurized or a fan is contained in the selectively sealable reservoir to force the gas contained in the selectively sealable reservoir through one or more of the secondary outlets.

10. The apparatus according to claim 1, wherein the selectively sealable reservoir is connected to the drainable container to allow transfer of the egg laying medium from the selectively sealable reservoir to the drainable container.

11. The apparatus according to claim 10, further comprising a secondary pump to facilitate the transfer of the egg laying medium.

12. An apparatus for controlling maturation of aquatically hatched insects, the apparatus comprising:
    a drainable container for housing an egg laying medium for the insects;
    a filter operatively connected to the container for harvesting unwanted matter from the egg laying medium;
    a selectively sealable catch basin located below the container for receiving the egg laying medium from the container when the container is drained, wherein one or more outlets directed towards the drainable container are provided on the selectively sealable catch basin for operatively releasing gas from the catch basin to an area in the vicinity of the drainable container; and a tank connected indirectly via a hose to the drainable container to allow transfer of the liquid from the tank to the drainable container.

13. The apparatus according to claim 12, further comprising a pump to facilitate the transfer of the liquid.

14. The apparatus according to claim 12, wherein the drainable container further comprises a valve positioned at a base of the container for controlling the flow of the egg laying medium from the container.

15. An apparatus for controlling maturation of aquatically hatched insects, the apparatus comprising:
   a drainable container for housing an egg laying medium for the insects;
   a filter operatively connected to the container for harvesting unwanted matter from the egg laying medium;
   a selectively sealable catch basin located below the container for receiving the egg laying medium from the container when the container is drained, wherein one or more outlets directed towards the drainable container are provided on the selectively sealable catch basin for operatively releasing gas from the catch basin to an area in the vicinity of the drainable container; and
   wherein the selectively sealable catch basin is pressurized or a fan is contained in the selectively sealable catch basin to force the gas contained in the selectively sealable catch basin through one or more of the outlets.

16. An apparatus for controlling maturation of aquatically hatched insects, the apparatus comprising:
   a drainable container for housing an egg laying medium for the insects;
   a filter operatively connected to the container for harvesting unwanted matter from the egg laying medium; and
   a selectively sealable catch basin located below the container for receiving the egg laying medium from the container when the container is drained, wherein one or more outlets directed towards the drainable container are provided on the selectively sealable catch basin for operatively releasing gas from the catch basin to an area in the vicinity of the drainable container;
   wherein a screen is positioned in the catch basin above the egg laying medium for preventing the release of insects from the catch basin.

* * * * *